(12) United States Patent
Burckart et al.

(10) Patent No.: US 7,499,926 B1
(45) Date of Patent: Mar. 3, 2009

(54) MAINTAINING AND REPLICATING CHAT HISTORIES

(75) Inventors: Erik John Burckart, Raleigh, NC (US); Steve Russell Campbell, Lillington, NC (US); Andrew Ivory, Wake Forest, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/941,099

(22) Filed: Nov. 16, 2007

(51) Int. Cl.
*G06F 17/30* (2006.01)

(52) U.S. Cl. .................. 707/10; 707/102; 707/104.1

(58) Field of Classification Search .................. 707/1, 707/10, 100, 101, 102, 104.1; 715/752, 753, 715/758, 759
See application file for complete search history.

(56) References Cited

U.S. PATENT DOCUMENTS

| | | | |
|---|---|---|---|
| 6,286,034 B1 * | 9/2001 | Sato et al. ................... 709/204 |
| 7,111,044 B2 * | 9/2006 | Lee ............................. 709/204 |
| 7,383,310 B1 * | 6/2008 | Lyle et al. .................... 709/207 |
| 2003/0126139 A1 * | 7/2003 | Lee et al. ..................... 707/100 |
| 2005/0111653 A1 * | 5/2005 | Joyce et al. ............ 379/265.09 |
| 2008/0091824 A1 * | 4/2008 | Patel et al. ................... 709/225 |
| 2008/0133511 A1 * | 6/2008 | Schoenberg ................... 707/5 |

* cited by examiner

*Primary Examiner*—Diane Mizrahi
(74) *Attorney, Agent, or Firm*—VanLeeuwen & VanLeeuwen

(57) ABSTRACT

A consolidated instant messaging message history is maintained at a selected point of presence. Non-selected instant messaging points of presence include instant messaging messages that were transmitted during one or more instant messaging sessions conducted between the non-selected instant messaging points of presence and one or more instant messaging participants. The selected instant messaging point of presence retrieves instant messaging messages included at the non-selected instant messaging points of presence. The retrieved messages are stored on a storage device accessible to the selected instant messaging point of presence in a consolidated instant messaging chat history.

8 Claims, 8 Drawing Sheets

MAINTAINING AND REPLICATING CHAT HISTORIES

BACKGROUND OF THE INVENTION

1. Technical Field

The present invention relates to a method that maintains and replicates instant messaging histories. More particularly, the present invention relates to a method that consolidates a user's chat histories when the user utilizes more than one device for conducting instant messaging sessions.

2. Description of the Related Art

Instant messaging has become a critical communications technology for many users and organizations. Instant messaging allows a user to create a "session" with one or more other users so that messages can be sent back and forth contemporaneously. The flow of messages in an instant message session creates a dialog between the user and other users with whom the user has established a session. In this manner, quick messages can be transmitted without sending an email message or telephoning the other user. Users can choose whether and when to respond to instant messages, much like an email message. However, unlike email messages, in instant messaging, a window is displayed on the user's display showing the messages between the user and another user.

Instant messaging is available from a variety of different devices, or platforms, such as a user's desktop computer system, a user's laptop computer system, a user's mobile telephone, and a user's personal digital assistant (PDA). Sometimes it is useful to browse previous instant messaging discussions and, to facilitate this, many individual systems retain a history of "chats" (text messages) that were sent and received during an instant messaging session that took place on that particular device. Some of these devices, however, such as a mobile telephone, may have limited storage capacities and may not be able to store much, if any, chat histories. Another challenge confronting a user that utilizes more than one device to engage in instant messaging sessions is that chat histories that may be stored on one device are often inaccessible from another device. For example, if a user is engaging in a new instant messaging session with a customer by using the user's desktop computer system, the user is unable to retrieve a previous chat histories that resulted from the user having instant messaging sessions with the customer when using the user's mobile telephone and the user's laptop computer system.

SUMMARY

It has been discovered that the aforementioned challenges are resolved by determining that a consolidated instant messaging message history is maintained at a selected instant messaging point of presence that is selected from a set of instant messaging points of presence. For example, at a desktop computer system when the set of instant messaging points of presence include the user's desktop computer system, the user's laptop computer system, and the user's mobile telephone. One or more of the non-selected instant messaging points of presence include instant messaging messages that were transmitted during one or more instant messaging sessions conducted between the non-selected instant messaging points of presence (such as the user using the laptop) and one or more instant messaging participants (such as a customer chatting with the user from the customer's computer system). The selected instant messaging point of presence retrieves instant messaging messages included at the non-selected instant messaging points of presence. The retrieved messages are stored on a nonvolatile storage device accessible to the selected instant messaging point of presence in a consolidated instant messaging chat history.

In one embodiment, the instant messaging messages at a first of the non-selected instant messaging points of presence are stored in one or more instant messaging local histories that are stored in a nonvolatile memory accessible from the first non-selected instant messaging point of presence. In this embodiment, a request is sent from the selected point of presence to the first non-selected point of presence. In response to the request, a set of the plurality of instant messaging messages is received at the selected instant messaging point of presence. In this embodiment, the set of instant messaging messages was retrieved from the first non-selected instant messaging point of presence's local history stored in the nonvolatile memory accessible from the first non-selected instant messaging point of presence. In a further embodiment, prior to retrieving the instant messaging messages, a group of network identifiers is read (e.g., from a configuration file), wherein each of the network identifiers corresponds to one of the non-selected instant messaging points of presence. In this further embodiment, the retrieving includes sending, from the selected instant messaging point of presence, an instant message retrieval request over a computer network to each of the non-selected instant messaging points of presence.

In another embodiment, an instant messaging chat history request is received from a first of the non-selected instant messaging points of presence. In response to receiving the instant messaging chat history request, the selected instant messaging point of presence retrieves one or more stored instant messaging messages from the consolidated instant messaging chat history and returns the retrieved instant messaging messages to the first non-selected instant messaging point of presence. In a further embodiment, prior to receiving the instant messaging chat history request, a chat list request is received from the first non-selected instant messaging point of presence. The selected instant messaging point of presence responds by retrieving one or more historical chat session identifiers, where each of the historical chat session identifiers corresponds to a prior instant messaging session from which messages are included in the consolidated instant messaging chat history. In this further embodiment, one or more historical chat session identifiers to the first non-selected instant messaging point of presence, with the received chat history request corresponding to one of the historical chat session identifiers, and where the instant messaging messages retrieved from the consolidated instant messaging chat history are messages that were transmitted during the prior instant messaging session corresponding to the selected historical chat identifier.

In yet another embodiment, the selected instant messaging point of presence requests a passive instant messaging session with an instant messaging server. While in a passive instant messaging session, the selected instant messaging point of presence receives instant messaging messages from the instant messaging server, where the received instant messaging messages correspond to messages transmitted during an active instant messaging session being concurrently conducted between one of the non-selected instant messaging points of presence (e.g., the user on his or her mobile phone) and the one or more instant messaging participants.

In another embodiment, prior to the determining that the consolidated history is being maintained on the selected instant messaging point of presence, instant messaging software application is invoked on the selected instant messaging point of presence. After the instant messaging software application has started, a configuration data store is read that includes an indicator to keep the consolidated instant messaging chat history at the selected instant messaging point of presence.

In one embodiment, a number of selected instant messaging points of presence are present, where the instant messaging messages are retrieved by each of the selected instant messaging points of presence. In this embodiment, multiple consolidated instant messaging chat histories are stored— one on each of the selected instant messaging points of presence.

In one embodiment, the user requests a chat history. In this embodiment, it is determined whether the consolidated instant messaging chat history is stored at the point of presence that the user is currently using. If the history is stored at the point of presence, then the stored instant messaging messages requested by the user are retrieved from the consolidated instant messaging chat history. On the other hand, if the history is not stored at the point of presence currently being used by the user, then an instant messaging chat history is requested from the user's current instant messaging point of presence to another instant messaging point of presence.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention.

Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
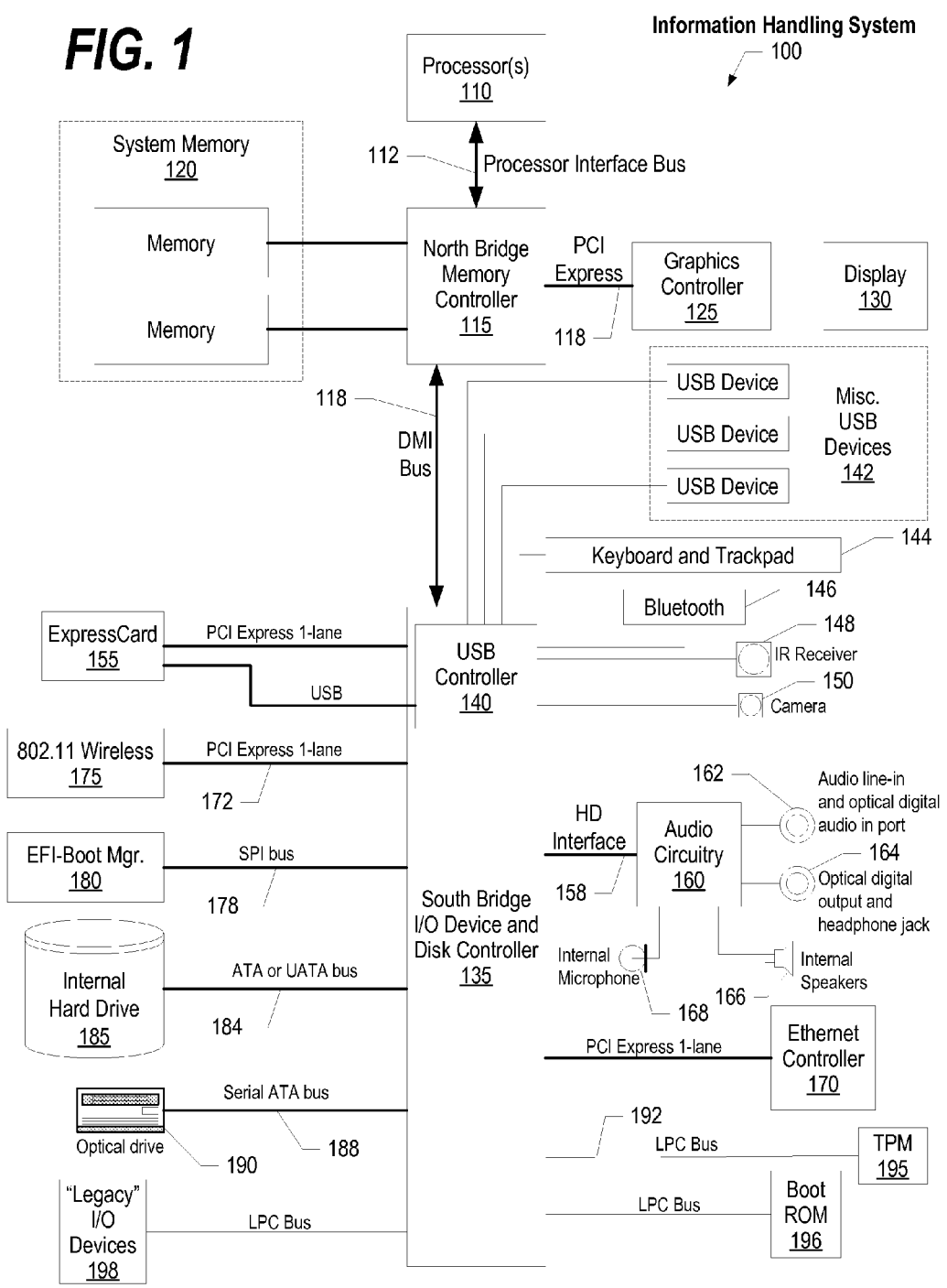
FIG. 1 is a block diagram of a data processing system in which the methods described herein can be implemented.
Figure 2:
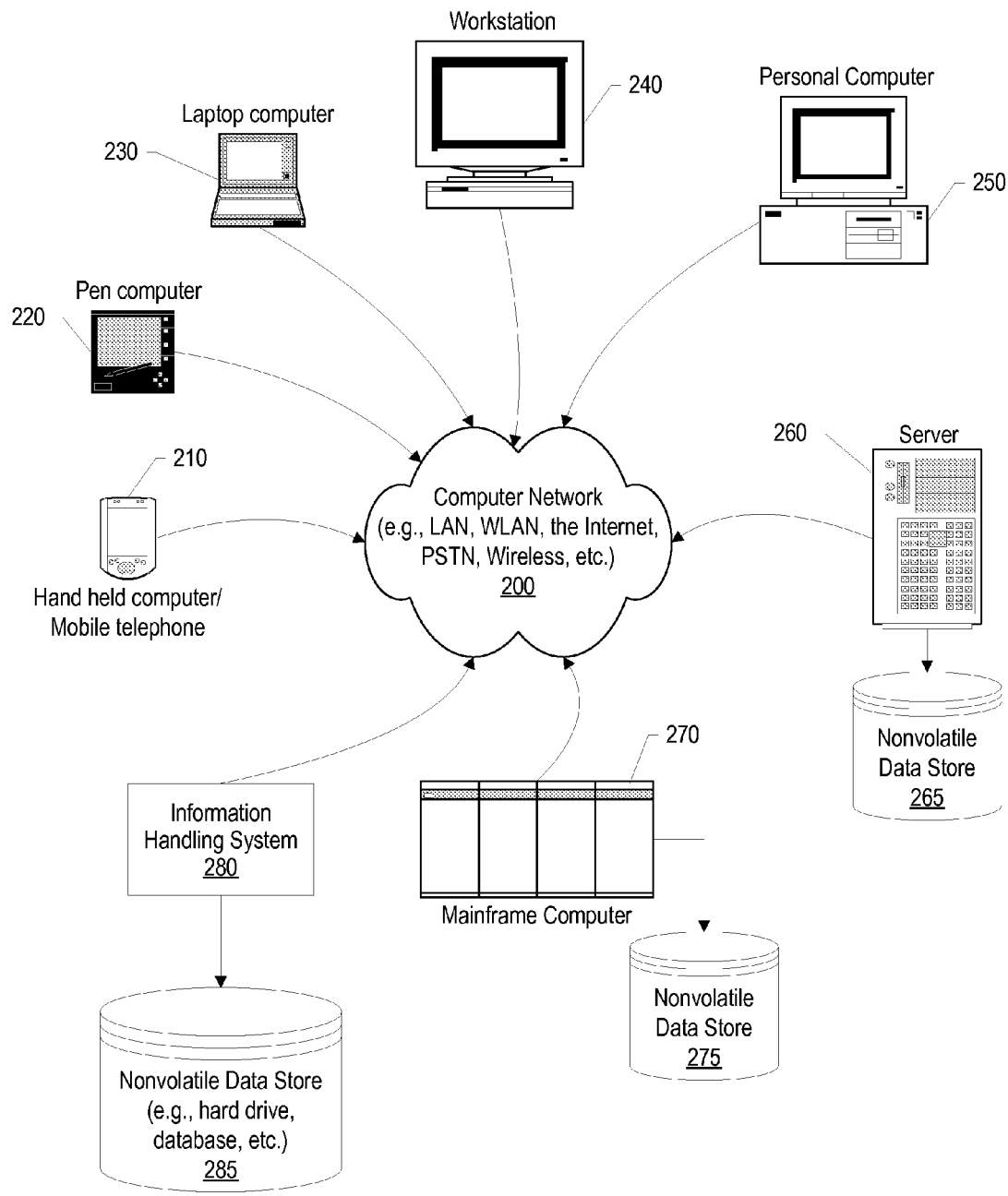
FIG. 2 provides an extension of the information handling system environment shown in FIG. 1 to illustrate that the methods described herein can be performed on a wide variety of information handling systems which operate in a networked environment.

FIG. 1 illustrates information handling system 100 which is a simplified example of a computer system capable of performing the computing operations described herein. Information handling system 100 includes one or more processors 110 which is coupled to processor interface bus 112. Processor interface bus 112 connects processors 110 to Northbridge 115, which is also known as the Memory Controller Hub (MCH). Northbridge 115 is connected to system memory 120 and provides a means for processor(s) 110 to access the system memory. Graphics controller 125 is also connected to Northbridge 115. In one embodiment, PCI Express bus 118 is used to connect Northbridge 115 to graphics controller 125. Graphics controller 125 is connected to display device 130, such as a computer monitor.

Northbridge 115 and Southbridge 135 are connected to each other using bus 118. In one embodiment, the bus is a Direct Media Interface (DMI) bus that transfers data at high speeds in each direction between Northbridge 115 and Southbridge 135. In another embodiment, a Peripheral Component Interconnect (PCI) bus is used to connect the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses can include PCI and PCI Express busses, an ISA bus, a System Management Bus (SMBus or SMB), a Low Pin Count (LPC) bus. The LPC bus is often used to connect low-bandwidth devices, such as boot ROM 196 and "legacy" I/O devices (using a "super I/O" chip). The "legacy" I/O devices (198) can include serial and parallel ports, keyboard, mouse, floppy disk controller. The LPC bus is also used to connect Southbridge 135 to Trusted Platform Module (TPM) 195. Other components often included in Southbridge 135 include a Direct Memory Access (DMA) controller, a Programmable Interrupt Controller (PIC), a storage device controller, which connects Southbridge 135 to nonvolatile storage device 185, such as a hard disk drive, using bus 184.

ExpressCard 155 is a slot used to connect hot-pluggable devices to the information handling system. ExpressCard 155 supports both PCI Express and USB connectivity as it is connected to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, Bluetooth device 146 which provides for wireless personal area networks (PANs), keyboard and trackpad 144, and other miscellaneous USB connected devices 142, such as a mouse, portable storage devices, modems, network cards, ISDN connectors, fax, printers, USB hubs, and many other types of USB connected devices.

Wireless Local Area Network (LAN) device 175 is connected to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 is connected to Southbridge 135 using Serial ATA (SATA) bus 188. Serial ATA adapters and devices communicate over a high-speed serial link. The Serial ATA bus is also used to connect Southbridge 135 to other forms of storage devices, such as hard disk drives. Audio circuitry 160, such as a sound card, is connected to Southbridge 135 via bus 158. Audio circuitry 160 is used to provide functionality such as audio line-in and optical digital audio in port 162, optical digital output and headphone jack 164, internal speakers 166, and internal microphone 168. Ethernet controller 170 is connected to Southbridge 135 using a bus, such as the PCI or PCI Express bus. Ethernet controller 170 is used to connect information handling system 100 with a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems which operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling system include nonvolatile data stores, such as hard drives and/or nonvolatile memory. Some of the information handling systems shown in FIG. 2 are depicted with separate nonvolatile data stores (server 260 is shown with nonvolatile data store 265, mainframe computer 270 is shown with nonvolatile data store 275, and information handling system 280 is shown with nonvolatile data store 285). The nonvolatile data store can be a component that is external to the various information handling systems or can be internal to one of the information handling systems. In addition, while not shown, an individual nonvolatile data store can be shared amongst two or more information handling systems using various techniques.

Figure 3:
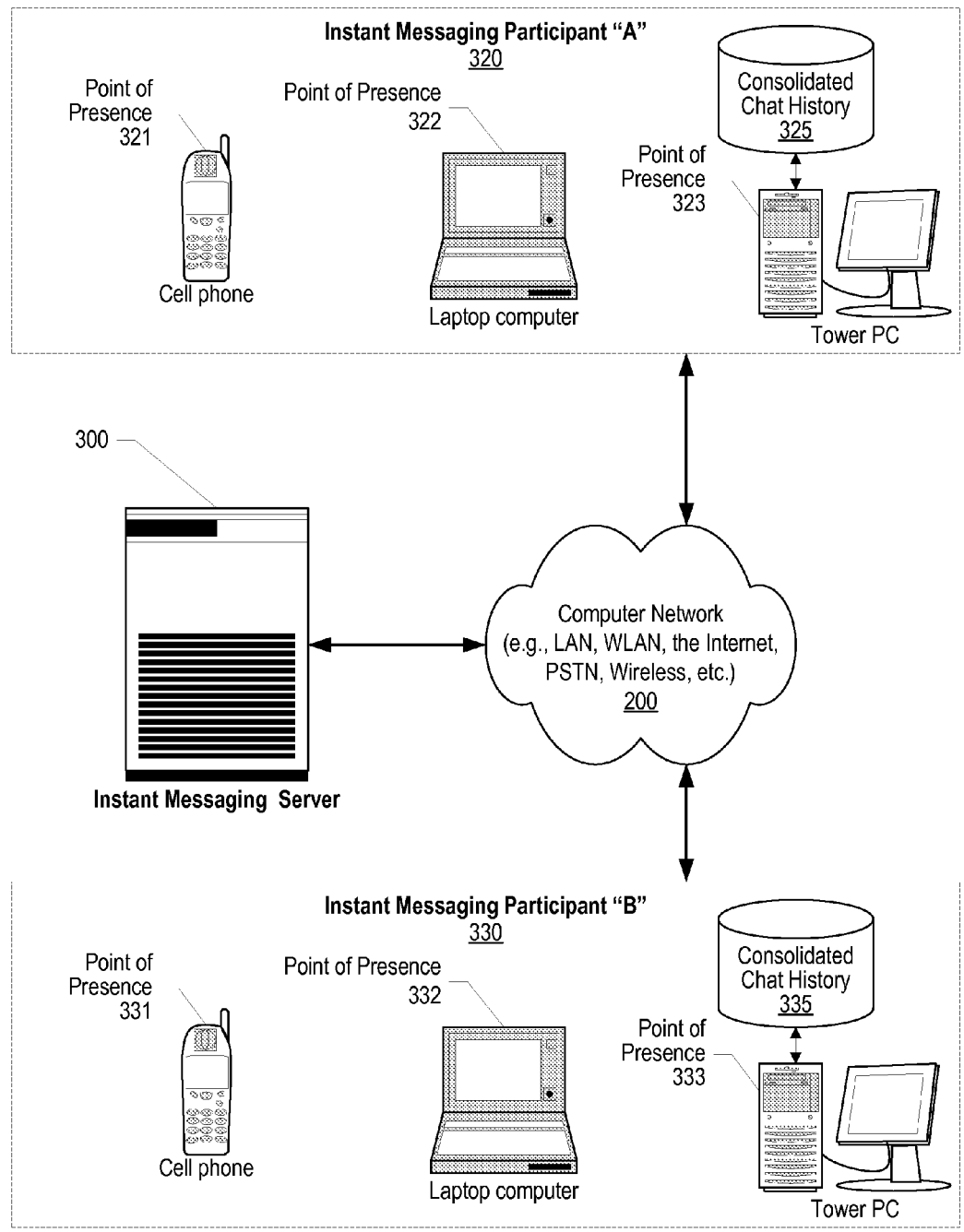
FIG. 3 is a diagram of the components used to consolidate instant messaging chat histories on a device accessible to a user.

FIG. 3 is a diagram of the components used to consolidate instant messaging chat histories on a device accessible to a user. FIG. 3 depicts two instant messaging participants—participant "A" 320 and participant "B" 330. These participants send and receive instant messaging messages to and from each other using instant messaging server 300 which is interconnected with the participants by computer network 200. Each participant engages in instant messaging sessions using a variety of devices, which are referred to as "points of presence." In the example shown, participant "A" (320) engages in instant messaging sessions using points of presence 321, 322 and 323, while participant "B" (330) engages in instant messaging sessions using points of presence 331, 332, and 333. Examples of different types of points of presence include mobile telephones, personal digital assistants (PDAs), laptop computer systems, desktop computer systems, and any other information handling system capable of engaging in an instant messaging session.

A user (e.g., participant "A" or participant "B") utilizes one point of presence to engage in an active instant messaging session. For example, if participant "A" is on mobile telephone 321 and participant "B" is on laptop computer system 332, these would be the points of presence for the instant messaging session. At least one of the points of presence is used to maintain a consolidated instant messaging chat history (consolidated instant messaging chat history 325 corresponding to a selected instant messaging point of presence for participant "A," and consolidated instant messaging chat history 335 corresponding to a selected instant messaging point of presence for participant "B"). In the example shown, each instant messaging participant has one consolidated instant messaging chat history, however multiple consolidated instant messaging chat histories could be maintained, such as one consolidated instant messaging chat history maintained by the participant's tower PC point of presence and one by another point of presence, such as the laptop computer system.

By maintaining a consolidated instant messaging chat history, all of the instant messaging messages sent and received by a particular participant can be stored in the consolidated instant messaging chat history. As will be shown in more detail below, stored instant messaging messages can be retrieved by other points of presence. For example, if participant "A" is away from the office and using mobile phone 321 to engage in an instant messaging session, the mobile phone can be used to retrieve older instant messaging messages that were generated during a previous instant messaging session and stored in consolidated instant messaging chat history 325.

Figure 4:
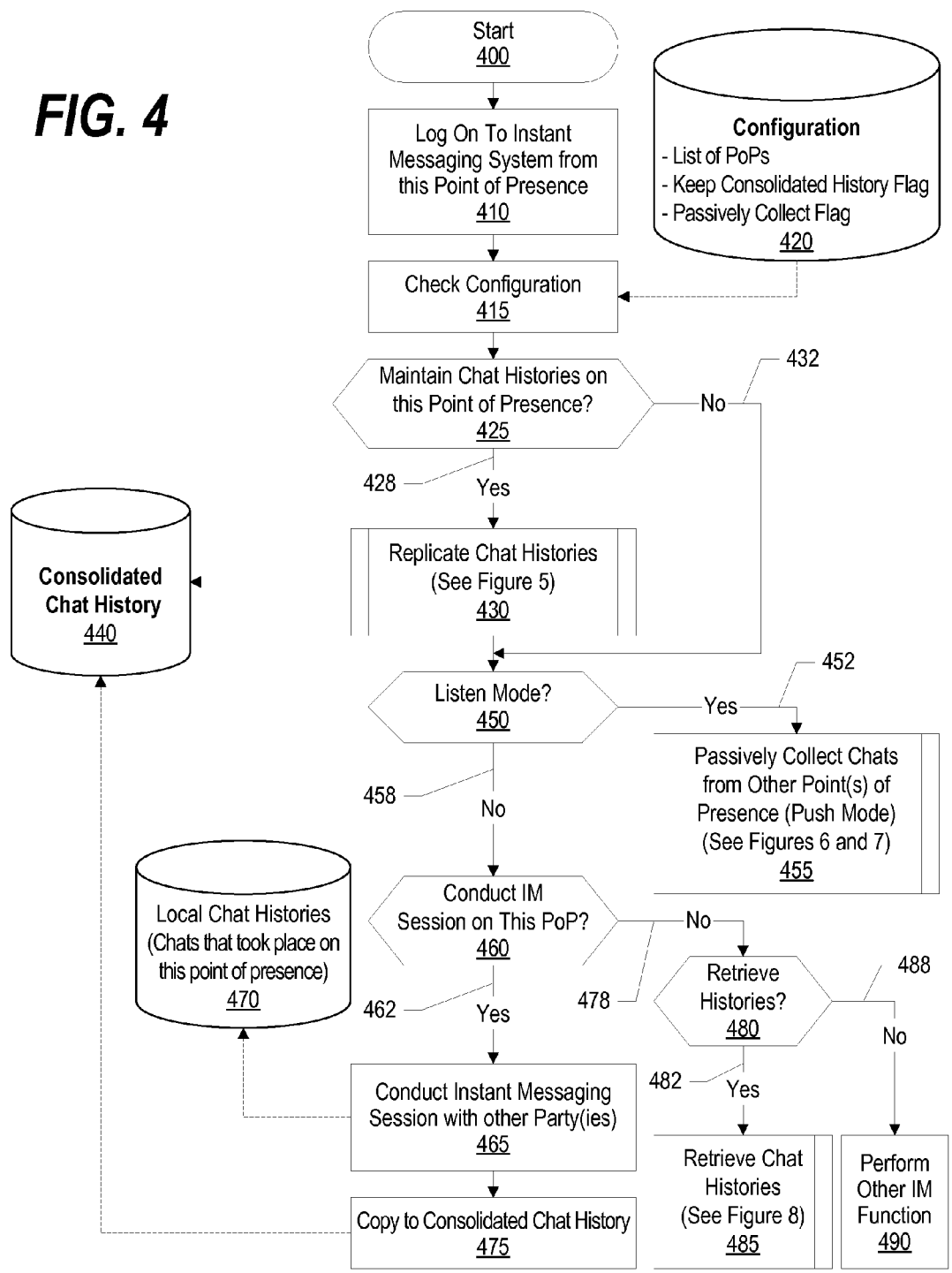
FIG. 4 is a high level flowchart showing steps used to consolidate chat histories.

FIG. 4 is a high level flowchart showing steps used to consolidate chat histories. Processing commences at 400 whereupon, at step 410, the user (e.g., participant "A," participant "B," etc.) logs onto an instant messaging system from one of their points of presence (e.g., a mobile telephone, a laptop computer system, a desktop computer system, etc.). At step 415, the configuration at the point of presence is checked using configuration data store 420. Configuration data store 420 is used to store a list of the user's points of presence (e.g., network addresses of the user's various points of presence, names/descriptions of the points of presence, etc.). Configuration data store 420 is also used to store a "keep consolidated history flag" which indicates whether this particular point of presence has been selected to maintain the consolidated instant messaging chat history. Configuration data store 420 also stores a flag as to whether the point of presence is used to passively listen to and record the participant's instant messaging sessions taking place on other points of presence, as will be explained in more detail in FIGS. 6 and 7.

A determination is made as to whether a consolidated instant messaging chat history is being maintained at this point of presence (decision 425). If a consolidated instant messaging chat history is being maintained at this point of presence, then decision 425 branches to "yes" branch 428 whereupon, at predefined process 430, local instant messaging chat histories are retrieved and stored in consolidated instant messaging chat history 440. On the other hand, if a consolidated instant messaging chat history is not being maintained on this point of presence, then decision 425 branches to "no" branch 432 bypassing predefined process 430.

A determination is made as to whether this point of presence is used to passively listen to and record messages being sent and received by the user (participant) when the user is using another point of presence as the active point of presence (decision 450). If this point of presence is used to passively listen to instant messaging sessions being conducted by the user on other points of presence, then decision 450 branches to "yes" branch 452 whereupon, at predefined process 455, the point of presence is used to passively listen to and record the participant's instant messaging sessions taking place on other points of presence (see FIGS. 6 and 7 and corresponding text for processing details).

On the other hand, if this point of presence is not being used to passively listen to other instant messaging sessions, then decision 450 branches to "no" branch 458 bypassing predefined process 455 and another determination is made as to whether the user is conducting an active instant messaging session on this point of presence (decision 460). If the user is conducting an instant messaging session on this point of presence, then decision 460 branches to "yes" branch 462 whereupon, at step 465, an active instant messaging session is established between this point of presence and one or more other instant messaging participants. In one embodiment, local instant messaging chat history 470 is used to store messages sent and received by this point of presence while conducting the active instant messaging session. When the instant messaging session is completed, the messages sent and received by this point of presence while conducting the instant messaging session are copied to consolidated instant messaging chat history 440. In one embodiment, step 475 is only performed if the consolidated instant messaging chat history is maintained on this point of presence. In another embodiment, step 475 is also performed if consolidated instant messaging chat history 440 is maintained on another point of presence by having this point of presence send the messages to the other point of presence.

Returning to decision 460, if an instant messaging session is not being conducted at this time on this point of presence, then decision 460 branches to "no" branch 478 whereupon a determination is made as to whether the user is requesting to retrieve previously saved instant messaging messages from previous instant messaging sessions either conducted on this point of presence or on another point of presence (decision 480). If the user is requesting to retrieve previously saved instant messaging messages, then decision 480 branches to "yes" branch 482 whereupon, at predefined process 485, the saved instant messaging messages that have been requested are retrieved. On the other hand, if the user is requesting some other instant messaging function, then decision 480 branches to "no" branch 488 whereupon the other requested instant messaging function is performed at 490.

Figure 5:
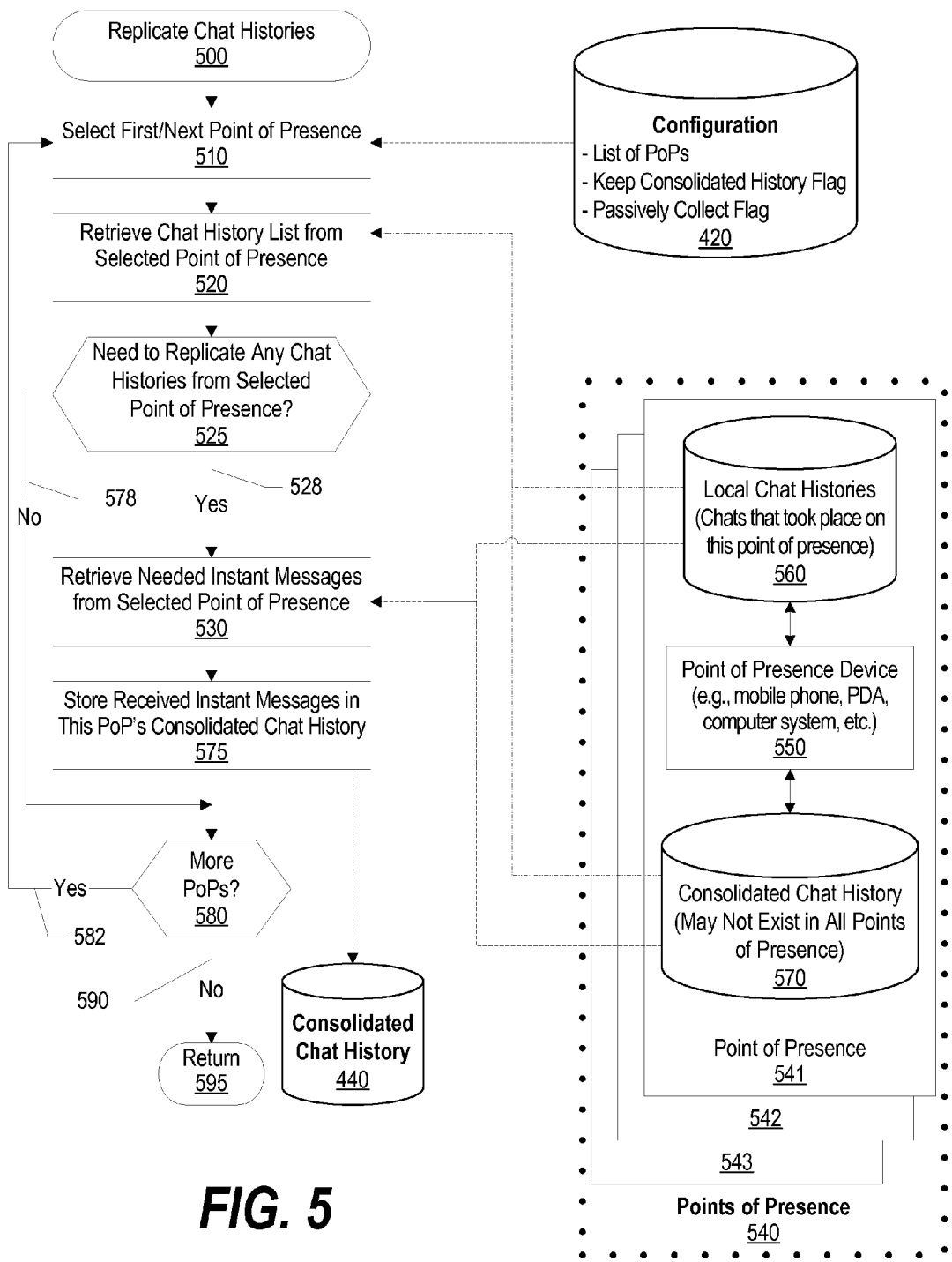
FIG. 5 is a flowchart showing steps used to replicate chat histories.

FIG. 5 is a flowchart showing steps used to replicate chat histories. Processing commences at 500 whereupon, at step 510, the first point of presence is selected by reading the list of points of presence that is stored in configuration data store 520. At step 520, a list of historical chat session identifiers is retrieved (e.g., timestamps of previous instant messaging sessions, etc.) that uniquely identifies the user's instant messaging sessions. Points of presence 540 includes one or more points of presence (e.g., points of presence 541, 542, and 543). Each point of presence, such as point of presence 541, can include a local instant messaging chat history 560 and a consolidated instant messaging chat history 570, and further includes a point of presence device 550, such as a computer system, a mobile telephone, or some other type of information handling system.

A determination is made as to whether any chat histories need to be replicated from the currently selected point of presence (decision 525). This determination is performed by comparing the identifiers currently stored in this point of presence's consolidated instant messaging chat history 440 with the identifiers stored on the currently selected point of presence. Note that the consolidated instant messaging chat history stored on the selected point of presence may include different instant messaging message than this point of presence and therefore the consolidated instant messaging chat history on this point of presence needs to be synchronized with the consolidated instant messaging chat history on the selected point of presence. In addition, the selected point of presence may have a local instant messaging chat history with messages that have not yet been copied to consolidated instant messaging chat history 440. For example, if the user conducted an instant messaging session using a mobile telephone as the point of presence and is now using the user's desktop computer system, the desktop computer system can retrieve the messages in the mobile telephone's local instant messaging chat history and store them in consolidated instant messaging chat history 440 stored in a nonvolatile storage device, such as a hard drive, that is accessible to at least this point of presence (the desktop computer system). If chat histories need to be copied from the selected point of presence to this point of presence's consolidated instant messaging chat history 440, decision 525 branches to "yes" branch 528 whereupon, at step 530, the instant messaging messages are retrieved from the selected point of presence and, at step 575, the received instant messaging messages are stored in this point of presence's consolidated instant messaging chat history 440.

A determination is made as to whether there are more points of presence to check (decision 580). If there are more points of presence to check, then decision 580 branches to "yes" branch 582 which loops back to select the next point of presence at step 510 and process the instant messaging messages stored on the newly selected point of presence accordingly. This looping continues until there are no more points of presence to check, at which point decision 580 branches to "no" branch 590 and processing ends at 595.

Figure 6:
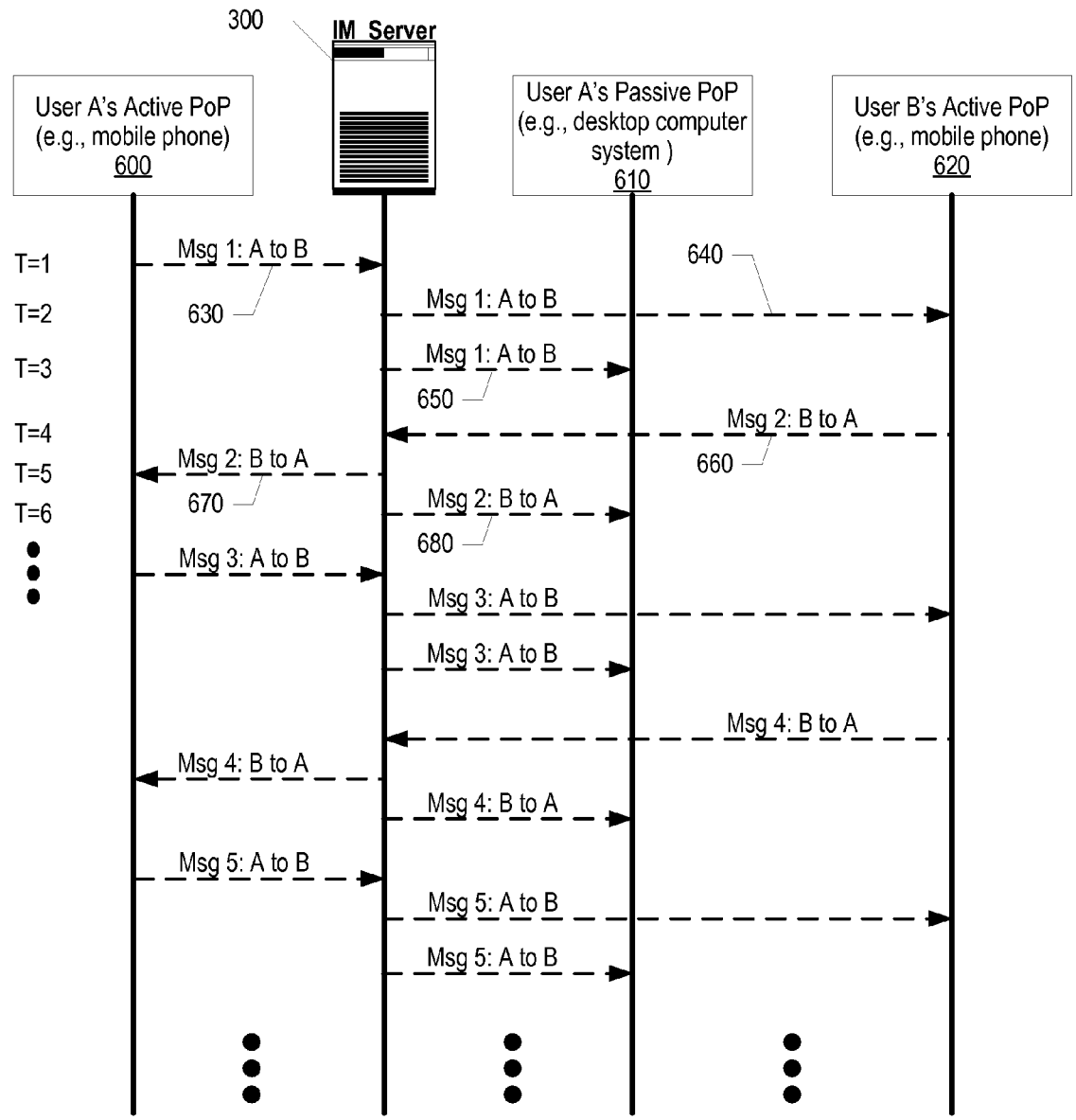
FIG. 6 is a timeline diagram depicting a passive point of presence receiving and storing instant messaging text transmitted during an instant messaging session between two active points of presence.

FIG. 6 is a timeline diagram depicting a passive point of presence receiving and storing instant messaging text transmitted during an instant messaging session between two active points of presence. One instant messaging participant (user) is associated with active point of presence 600 and passive point of presence 610. For example, the user's active point of presence could be a mobile telephone, while the passive point of presence could be a more powerful desktop computer system. The user's active point of presence 600 is conducting an instant messaging session with user B's point of presence 620, such as user B's mobile telephone. The instant messaging session is facilitated and managed by instant messaging server 300.

At time=1 (T=1), user A's point of presence 600 sends message 1 to user B (transmission 630). Transmission 630 is received by instant messaging server 300 that is facilitating the instant messaging session. At time=2 (T=2), instant messaging server 300 resends message 1 to B's point of presence 620 (transmission 640). In addition, at time=3 (T=3), instant messaging server 300 also sends message 1 to A's passive point of presence 610 (transmission 650). A's passive point of presence can thus retain message 1 in a consolidated instant messaging chat history stored on a nonvolatile storage device accessible to at least point of presence 610.

At time=4 (T=4), user B's point of presence 620 sends message 2 to user A (transmission 660). Transmission 660 is again received by instant messaging server 300 that is facilitating the instant messaging session. At time=5 (T=5), instant messaging server 300 resends message 2 to A's point of presence 600 (transmission 6700). In addition, at time=6 (T=6), instant messaging server 300 also sends message 2 to A's passive point of presence 610 (transmission 680). A's passive point of presence also retains message 2 in the consolidated instant messaging chat history.

As can be seen, transmissions continue in the fashion described above with A's passive point of presence 610 continuing to receive copies of all messages sent to or from A's active point of presence 600. As will be seen in FIG. 7, passive point of presence's ability to receive these messages is also facilitated by instant messaging server 300 by having the passive point of presence (e.g., A's desktop computer system, etc.) establish a passive session with the instant messaging server. In a preferred embodiment, as a passive participant, point of presence 610 only receives messages from the instant messaging server and does not send messages to any of the instant messaging session participants.

Figure 7:
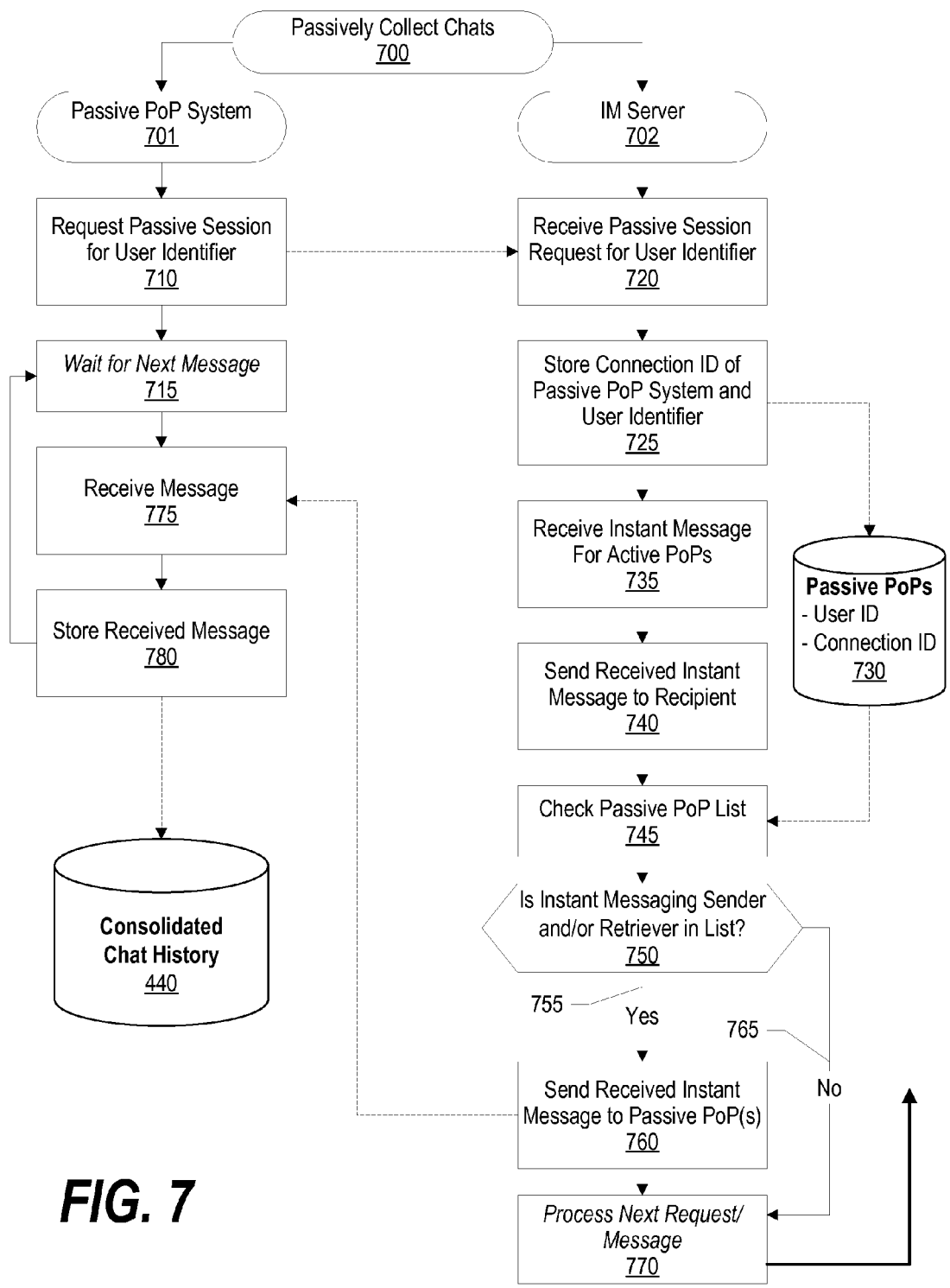
FIG. 7 is a flowchart depicting passive collection of instant messaging messages.

FIG. 7 is a flowchart depicting passive collection of instant messaging messages. Overall processing commences at 700 with the passive point of presence system's processing shown commencing at 701 and instant messaging processing shown commencing at 702. Starting with passive point of presence processing, processing commences at 701 whereupon, at step 710, the passive point of presence system requests a passive instant messaging session with the instant messaging server and provides the instant messaging server with the user's identifier (e.g., the unique user name used by the user, such as an email address, when participating in instant messaging sessions). At step 715, the passive point of presence waits for instant messaging messages to be received from the instant messaging server.

Turning to instant messaging server processing, processing commences at 702 whereupon, at step 720, the instant messaging server receives the passive session request from the passive point of presence with the request including the user's identifier. At step 725, the instant messaging server stores the connection identifier (e.g., network address) of the passive point of presence along with the user identifier associated with the passive point of presence in passive point of presence data store 730. While shown as a disk symbol, those of skill in the art will appreciate that the list of passive points of presence can be maintained in any volatile or nonvolatile memory or storage. At step 735, the instant messaging server receives instant messaging messages sent by one active point of presence (participant) and addressed to another active point of presence (participant) as part of an instant messaging session that was established either before or after the passive point of presence established the passive session. At step 740, the instant messaging server sends the received instant messaging message to the intended recipient. At step 745, the instant messaging server checks passive point of presence data store 730 to ascertain whether the sender or receiver of the instant messaging message is included in the list. A determination is made as to whether the sender and/or the receiver of the instant messaging message is included in passive point of presence list 730 (decision 750). If the sender and/or the receiver of the instant messaging message is included in list 730, then decision 750 branches to "yes" branch 755 whereupon, at step 760, the instant messaging message that was received by the instant messaging server is sent to the passive point of presence (or points of presence if both are in the list). On the other hand, if neither the sender or the receiver of the instant messaging is in the list, then decision 750 branches to "no" branch 765 bypassing step 760. At step 770, instant messaging server processing loops back to receive the next message or request.

Returning to passive point of presence processing, at step 775, the passive point of presence receives the message from the instant messaging server. At step 780, the received message is stored in consolidated instant messaging chat history 440. Processing then loops back to wait for the next instant messaging message to be received from the instant messaging server.

Figure 8:
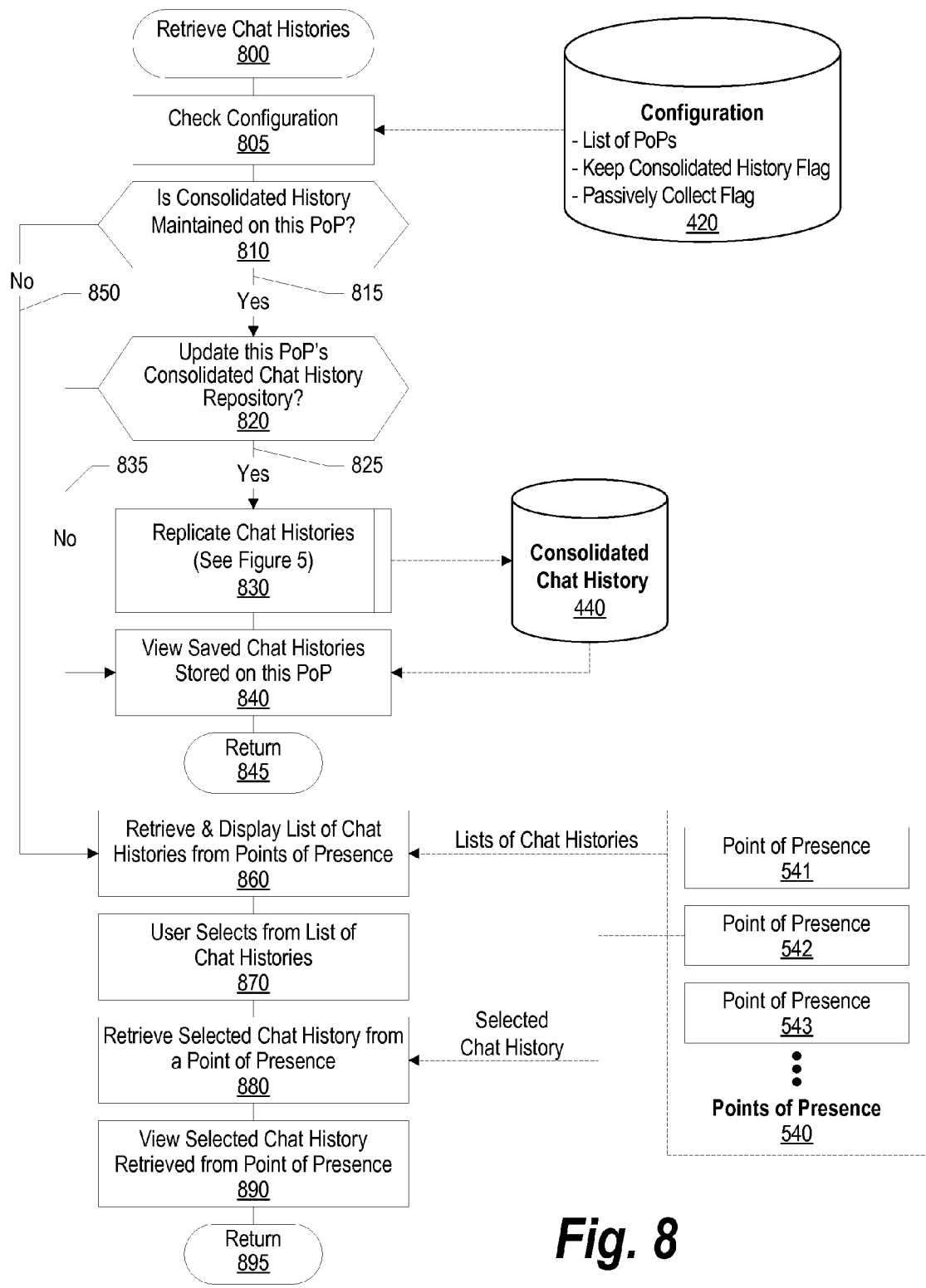
FIG. 8 is a flowchart showing steps taken to retrieve chat histories that may be stored on another point of presence.

FIG. 8 is a flowchart showing steps taken to retrieve chat histories that may be stored on another point of presence. Processing commences at 800 whereupon, at step 805, configuration data store 420 is checked. As previously described, configuration data store 420 includes various configuration data used to control how a point of presence operates. A determination is made as to whether a consolidated instant messaging chat history is maintained on this point of presence (decision 810). If a consolidated instant messaging chat history is maintained on this point of presence, then decision 810 branches to "yes" branch 815 whereupon, a determination is made as to whether to update this point of presence's consolidated instant messaging chat history before viewing the instant messaging messages stored in the consolidated instant messaging chat history (decision 820). If this point of presence's consolidated instant messaging chat history is to be updated, then decision 820 branches to "yes" branch 825 whereupon, at predefined process 830, instant messaging messages are retrieved from other points of presence and stored in consolidated instant messaging chat history 440 (see FIG. 5 and corresponding text for processing details). On the other hand, if this point of presence's consolidated instant messaging chat history is not being updated, then decision 820 branches to "no" branch 835 bypassing predefined process 830. At step 840, the user views instant messaging messages stored in consolidated instant messaging chat history 440. These stored instant messaging messages correspond to previous instant messaging sessions conducted by the user with one or more other instant messaging participants. Processing then returns (e.g., to the processing shown in FIG. 4), at 845.

Returning to decision 810, if a consolidated instant messaging chat history is not maintained on this point of presence, then decision 810 branches to "no" branch 850 in order to retrieve instant messaging messages stored on other points of presence. For example, if the point of presence being used by the user is a mobile telephone or another device with limited resources, then the consolidated instant messaging chat history would likely not be stored on such device. Steps 860 through 890, described below, allow the user to retrieve stored instant messaging messages from such a device.

"No" branch 850 branches to step 860 whereupon a list of chat histories are retrieved from other points of presence and the list is displayed on the user's current point of presence. At step 860, a list of historical chat session identifiers is retrieved (e.g., timestamps of previous instant messaging sessions, etc.) that uniquely identifies the user's instant messaging sessions and this list is displayed (e.g., on a display screen accessible from the current point of presence). At step 870, the user makes a selection from the list of chat session identifiers (e.g., selecting a particular instant messaging session that took place in the past). At step 880, the instant messaging messages corresponding to the selected chat session identifier are retrieved from one of the points of presence, and at step 890, the retrieved instant messaging messages are displayed on the display device accessibly by the user's current point of presence and these messages are viewed by the user. Processing then returns (e.g., to the processing shown in FIG. 4), at 845.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
   determining that a consolidated instant messaging chat history is maintained at a selected instant messaging point of presence that is selected from a plurality of instant messaging points of presence, wherein one or more of the non-selected instant messaging points of presence include one or more local chat histories stored on one or more local nonvolatile storage devices, the local chat histories comprising a first plurality of instant messaging messages transmitted during one or more previous instant messaging sessions conducted between the non-selected instant messaging points of presence and one or more instant messaging participants, the instant messaging participants being different than the plurality of instant messaging points of presence;
   in response to the determination, retrieving, at the selected instant messaging point of presence, the plurality of instant messaging messages included at the non-selected instant messaging points of presence from the local chat histories of the non-selected instant messaging points of presence;
   creating an updated consolidated instant messaging chat history by storing, on a selected nonvolatile storage device accessible to the selected instant messaging point of presence, the retrieved instant messaging messages in the consolidated instant messaging chat history;
   in response to creating the updated consolidated instant messaging chat history, initiating, by the selected instant messaging point of presence, a passive instant messaging session;
   in response to initiating the passive instant messaging session, receiving, at the selected instant messaging point of presence, a second plurality of instant messaging messages, wherein the second plurality of instant messaging messages correspond to a plurality of messages transmitted during an active instant messaging session being concurrently conducted between a first of the non-selected instant messaging points of presence and one or more of the instant messaging participants; and
   storing the second plurality of instant messaging messages in the updated consolidated instant messaging chat history.

2. The method of claim 1 further comprising:
   prior to the retrieving:
      reading a plurality of network identifiers, wherein each of the network identifiers corresponds to one of the non-selected instant messaging points of presence;
   wherein the retrieving further includes:
      sending, from the selected instant message point of presence, an instant message retrieval request over a computer network to each of the non-selected instant messaging points of presence.

3. The method of claim 1 further comprising:

receiving, at the selected instant messaging point of presence, an instant messaging chat history request from a second of the non-selected instant messaging points of presence;

in response to receiving the instant messaging chat history request:

retrieving one or more stored instant messaging messages from the consolidated instant messaging chat history; and returning the retrieved instant messaging messages to the second non-selected instant messaging point of presence.

4. The method of claim 3 further comprising:

prior to receiving the instant messaging chat history request, receiving a chat list request from the second non-selected instant messaging point of presence;

in response to receiving the chat list request:

retrieving one or more historical chat session identifiers, wherein each of the historical chat session identifiers corresponds to a prior instant messaging session from which messages are included in the consolidated instant messaging chat history; and returning the one or more historical chat session identifiers to the second non-selected instant messaging point of presence, wherein the received chat history request corresponds to a selected one of the historical chat session identifiers, and wherein the instant messaging messages retrieved from the consolidated instant messaging chat history are messages that were transmitted during the prior instant messaging session corresponding to the selected historical chat identifier.

5. The method of claim 1 further comprising:

prior to the determining:

commencing execution of an instant messaging software application on the selected instant messaging point of presence; and reading a configuration data store that includes an indicator to keep the consolidated instant messaging chat history at the selected instant messaging point of presence, the reading of the indicator resulting in the determination.

6. The method of claim 1 wherein a plurality of selected instant messaging points of presence are present, wherein the plurality of instant messaging messages are retrieved by each of the plurality of selected instant messaging points of presence and wherein the consolidated instant messaging chat history is stored at each of the plurality of selected instant messaging points of presence.

7. The method of claim 1 further comprising:

receiving, from a user, a chat history request, while the user is using a first of the plurality of instant messaging points of presence;

determining whether the consolidated instant messaging chat history is stored at the first instant messaging point of presence;

in response to determining that the consolidated instant messaging chat history is stored at the first instant messaging point of presence:

retrieving one or more stored instant messaging messages from the consolidated instant messaging chat history stored at the first instant messaging point of presence; and in response to determining that the consolidated instant messaging chat history is not stored at the first instant messaging point of presence:

requesting an instant messaging chat history from the first instant messaging point of presence to the selected instant messaging point of presence.

8. The method of claim 7 further comprising:

receiving, at the first instant messaging point of presence, a plurality of instant messaging messages retrieved by the selected instant messaging point of presence from the consolidated instant messaging chat history.

* * * * *